US011153489B2

(12) United States Patent
Kok

(10) Patent No.: US 11,153,489 B2
(45) Date of Patent: Oct. 19, 2021

(54) SYSTEMS AND METHODS FOR STABILIZING VIDEOS

(71) Applicant: GoPro, Inc., San Mateo, CA (US)

(72) Inventor: Sophana Kok, Voisins-le-Bretonneux (FR)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/987,829

(22) Filed: Aug. 7, 2020

(65) Prior Publication Data

US 2020/0374459 A1 Nov. 26, 2020

Related U.S. Application Data

(63) Continuation of application No. 16/512,105, filed on Jul. 15, 2019, now Pat. No. 10,742,885.

(60) Provisional application No. 62/850,401, filed on May 20, 2019.

(51) Int. Cl.

*H04N 5/232* (2006.01)
*H04N 5/225* (2006.01)

(52) U.S. Cl.

CPC ....... *H04N 5/23258* (2013.01); *H04N 5/2252* (2013.01); *H04N 5/23274* (2013.01); *H04N 5/23277* (2013.01)

(58) Field of Classification Search

CPC .................................................. H04N 5/23258
USPC ..................................................... 348/208.99
See application file for complete search history.

(56) References Cited

U.S. PATENT DOCUMENTS 10,880,481 B2 * 12/2020 Noguchi ............ H04N 5/23258
2006/0017813 A1 1/2006 Okubo
2017/0078577 A1 3/2017 Wakamatsu

* cited by examiner

*Primary Examiner* — Joel W Fosselman
(74) *Attorney, Agent, or Firm* — Esplin & Associates, PC

(57) ABSTRACT

Visual content may be captured by an image capture device during a capture duration. The rotational positions of the image capture device may change during the capture duration. The rotational positions of the image capture device may be smoothed based on a look ahead of a rotation constraint. A punchout of the visual content may be determined based on the smoothed rotational positions. The punchout of the visual content may be used to generate stabilized visual content.

20 Claims, 9 Drawing Sheets

System 10

Processor 11

Machine-Readable Instructions 100

Position Component 102

Smoothed Position Component 104

Viewing Window Component 106

Generation Component 108

Interface 12

Electronic Storage 13

| | P | P+1 | P+2 | P+3 | P+4 | P+5 | P+6 | P+7 |
|---|---|---|---|---|---|---|---|---|
| S5 | C | X | X | X | X | X | X | X |
| S4 | C | C | X | X | X | X | X | X |
| S3 | C | C | C | X | X | X | X | X |
| S2 | C | C | C | C | X | X | X | X |
| S1 | C | C | C | C | C | X | X | X |
| S0 | OK | OK | OK | OK | OK | OK | OK | OK |

C: computable
X: not computable

FIG. 6A

| | 0 | 1 | 2 | 3 | 4 | 5 | 6 | 7 | 8 |
|---|---|---|---|---|---|---|---|---|---|
| | P-1 | P | P+1 | P+2 | P+3 | P+4 | P+5 | P+6 | P+7 |
| S5 | ? | C | X | X | X | X | X | X | X |
| S4 | PKO | C2 | C | X | X | X | X | X | X |
| S3 | >POK | C1 | C2 | C | X | X | X | X | X |
| S2 | POK | POK | C1 | C2 | C | X | X | X | X |
| S1 | POK | POK | POK | C1 | C2 | C | X | X | X |
| S0 | OK | OK | OK | OK | OK | OK | OK | OK | OK |

POK: Previously computed as OK
PKO: Previously computed as not OK

FIG. 6B

| | 0 | 1 | 2 | 3 | 4 | 5 | 6 | 7 | 8 |
|---|---|---|---|---|---|---|---|---|---|
| | P-6 | P-5 | P-4 | P-3 | P-2 | P-1 | P | P+1 | P+2 |
| S5 | ? | | POK | | | | | X | X |
| S4 | PKO | >POK< | >POK< | POK | | | | | X |
| S3 | >POK< | POK | POK | >POK< | PKO | PKO | C2 | | |
| S2 | POK | POK | POK | POK | >POK< | >POK< | C1 | C2 | |
| S1 | POK | POK | POK | POK | POK | POK | POK | C1 | C2 |
| S0 | OK | OK | OK | OK | OK | OK | OK | OK | OK |

POK: Previously computed as OK
PKO: Previously computed as not OK

FIG. 6C

SYSTEMS AND METHODS FOR STABILIZING VIDEOS

FIELD

This disclosure relates to stabilizing videos using a look ahead of a rotation constraint.

BACKGROUND

A video may have been captured by an image capture device in motion. The motion of the image capture device during the capture of the video may cause the video to appear jerky/shaky.

SUMMARY

This disclosure relates to stabilizing videos. Visual content having a field of view may be captured by an image capture device during a capture duration. The visual content captured at different moments within the capture duration may be included within images. The images may include a first image including the visual content captured at a first moment within the capture duration, a second image including the visual content captured at a second moment subsequent to the first moment within the capture duration, and/or other images. Visual information defining the visual content, position information characterizing rotational positions of the image capture device at different moments within the capture duration, and/or other information may be obtained. The rotational positions of the image capture device corresponding to the images may be determined based on the position information and/or other information. The rotational positions may include a first rotational position corresponding to the first image, a second rotational position corresponding to the second image, and/or other rotational positions corresponding to other images.

Smoothed rotational positions of the image capture device corresponding to the images may be determined based on a look ahead of a rotation constraint and/or other information. The look ahead of the rotation constraint may include determination of whether the rotation constraint is violated for one or more subsequent images to determine a smoothed rotational position corresponding an individual image. A first smoothed rotational position corresponding to the first image may be determined based on determination of whether the crop-constraint is violated for the second image captured subsequent to the first image. A viewing window for the images may be determined based on the smoothed rotational positions of the image capture device and/or other information. The viewing window may define one or more extents of the images to be included within stabilized visual content. The stabilized visual content may be generated based on the viewing window and/or other information. The stabilized visual content may include a punchout of the extent(s) of the images within the viewing window.

A system that stabilizes videos may include one or more electronic storages, one or more processors, and/or other components. An electronic storage may store visual information defining visual content, information relating to visual content, information relating to images, position information characterizing rotational positions of an image capture device, information relating to rotational positions of the image capture device, information relating to smoothing of rotational positions of the image capture device, information relating to smoothed rotational positions of the image capture device, information relating to a rotation constraint, information relating to a look ahead of a rotation constraint, information relating to a field of view of an optical element, information relating to a viewing window, information relating to stabilized visual content, information relating to a punchout of images, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

An optical element may be configured to guide light within a field of view to an image sensor. The field of view may be larger than a size of the punchout/viewing window used to generate stabilized visual content.

An image sensor may be configured to generate a visual output signal based on light that becomes incident thereon during a capture duration. The visual output signal may convey visual information that defines visual content having the field of view. The visual content captured at different moments within the capture duration may be included within images. The images may include a first image including the visual content captured at a first moment within the capture duration, a second image including the visual content captured at a second moment subsequent to the first moment within the capture duration, and/or other images.

A position sensor may be configured to generate a position output signal based on positions of the housing during the capture duration. The position output signal may convey position information that characterizes rotational positions of the housing at different moments within the capture duration. In some implementations, the position information may further characterize translational positions of the housing at different moments within the capture duration. In some implementations, the position sensor may include one or more of a gyroscope, an accelerometer, and/or an inertial measurement unit. The position information may be determined independent of the visual information.

The processor(s) may be configured by machine-readable instructions. Executing the machine-readable instructions may cause the processor(s) to facilitate stabilizing videos. The machine-readable instructions may include one or more computer program components. The computer program components may include one or more of a position component, a smoothed position component, a viewing window component, a generation component, and/or other computer program components.

The position component may be configured to determine the rotational positions of the image capture device corresponding to the images based on the position information and/or other information. The rotational positions may include a first rotational position corresponding to the first image, a second rotational position corresponding to the second image, and/or other rotational positions corresponding to other images.

The smoothed position component may be configured to determine smoothed rotational positions of the image capture device corresponding to the images based on a look ahead of a rotation constraint and/or other information. The look ahead of the rotation constraint may include determination of whether the rotation constraint is violated for one or more subsequent images to determine a smoothed rotational position corresponding an individual image. A first smoothed rotational position corresponding to the first image may be determined based on determination of whether the rotation constraint is violated for the second image captured subsequent to the first image.

In some implementations, the rotation constraint may be violated based on the viewing window extending beyond the field of view of the visual content included within the images and/or other information.

In some implementations, the determination of the smoothed rotational positions of the image capture device corresponding to the images based on the look ahead of the rotation constraint may include one or more adjustments of a size of a smoothing window for smoothing the rotational positions of the image capture device. The size of the smoothing window may be adjusted based on the determination of whether the rotation constraint is violated for the subsequent image(s) and/or other information.

In some implementations, the size of the smoothing window may correspond to a number of the rotational positions of the image capture device that are smoothed to determine the smoothed rotational positions of the image capture device. In some implementations, the smoothing window may include a first number of preceding rotational positions of the image capture device and a second number of subsequent rotational positions of the image capture device.

In some implementations, the size of the smoothing window may be adjusted such that the rotation constraint is satisfied for the subsequent image(s). In some implementations, the size of the smoothing window may be adjusted to maximize the size of the smoothing window while satisfying the rotation constraint.

In some implementations, the size of the smoothing window may be adjusted by incrementing or decrementing the number of the rotational positions of the image capture device included within the size of the smoothing window. For example, the first image and the second image may be adjacent video frames. The size of the smoothing window may include a first size for the first image and a second size for the second image. The second size for the second image may be determined based on copying, incrementing, or decrementing the first size for the first image.

The viewing window component may be configured to determine a viewing window for the images based on the smoothed rotational positions of the image capture device and/or other information. The viewing window may define one or more extents of the images to be included within stabilized visual content.

The generation component may be configured to generate the stabilized visual content based on the viewing window and/or other information. The stabilized visual content may include a punchout of the extent(s) of the images within the viewing window.

In some implementations, at least one of the processor(s) may be a remote processor located remotely from the housing of the image capture device. Generation of the stabilized visual content may be performed by the remote processor post capture of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 6A illustrates example analysis of smoothness using a look ahead of a rotation constraint.

FIG. 6B illustrates example analysis of smoothness using a look ahead of a rotation constraint.

FIG. 6C illustrates example analysis of smoothness using a look ahead of a rotation constraint.

DETAILED DESCRIPTION

Figure 1:
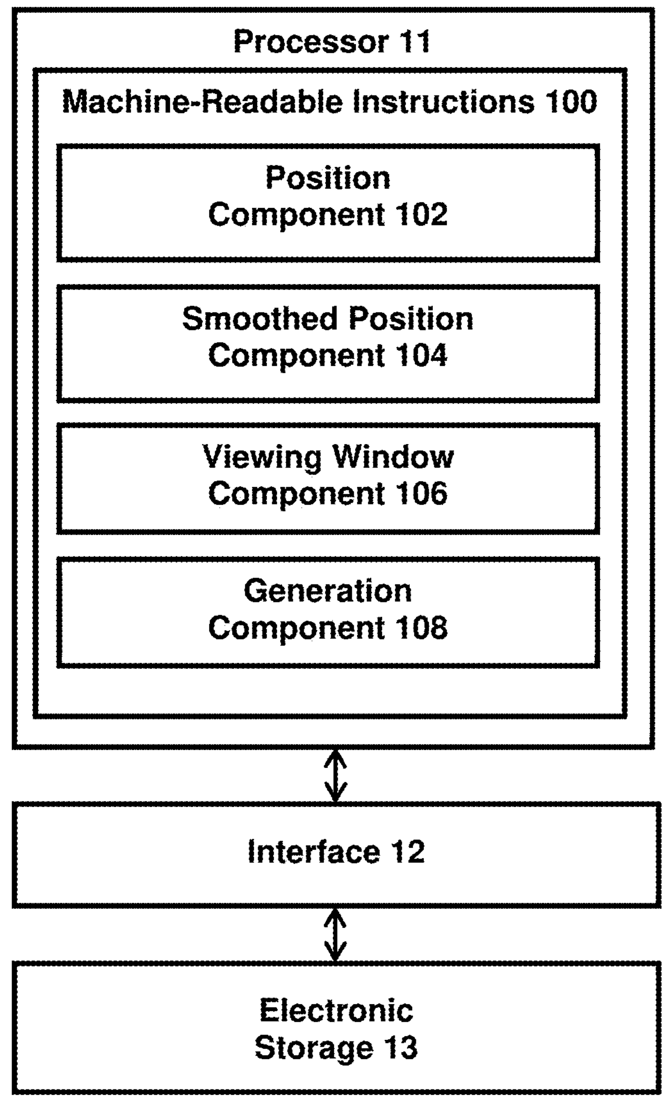
FIG. 1 illustrates an example system that stabilizes videos.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Visual content having a field of view may be captured by an image capture device during a capture duration. The visual content captured at different moments within the capture duration may be included within images. The images may include a first image including the visual content captured at a first moment within the capture duration, a second image including the visual content captured at a second moment subsequent to the first moment within the capture duration, and/or other images. Visual information defining the visual content, position information characterizing rotational positions of the image capture device at different moments within the capture duration, and/or other information may be obtained. The rotational positions of the image capture device corresponding to the images may be determined based on the position information and/or other information. The rotational positions may include a first rotational position corresponding to the first image, a second rotational position corresponding to the second image, and/or other rotational positions corresponding to other images.

Smoothed rotational positions of the image capture device corresponding to the images may be determined based on a look ahead of a rotation constraint and/or other information. The look ahead of the rotation constraint may include determination of whether the rotation constraint is violated for one or more subsequent images to determine a smoothed rotational position corresponding an individual image. A first smoothed rotational position corresponding to the first image may be determined based on determination of whether the crop-constraint is violated for the second image captured subsequent to the first image. A viewing window for the images may be determined based on the smoothed rotational positions of the image capture device and/or other information. The viewing window may define one or more extents of the images to be included within stabilized visual content. The stabilized visual content may be generated based on the viewing window and/or other information. The stabilized visual content may include a punchout of the extent(s) of the images within the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to images, position information characterizing rotational positions of an image capture device, information relating to rotational positions of the image capture device, information relating to smoothing of rotational positions of the image capture device, information relating to smoothed rotational positions of the image capture device, information relating to a rotation constraint, information relating to a look ahead of a rotation constraint, information relating to a field of view of an optical element, information relating to a viewing window, information relating to stabilized visual content, information relating to a punchout of images, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a position component 102, a smoothed position component 104, a viewing window component 106, a generation component 106, and/or other computer program components.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical elements, image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
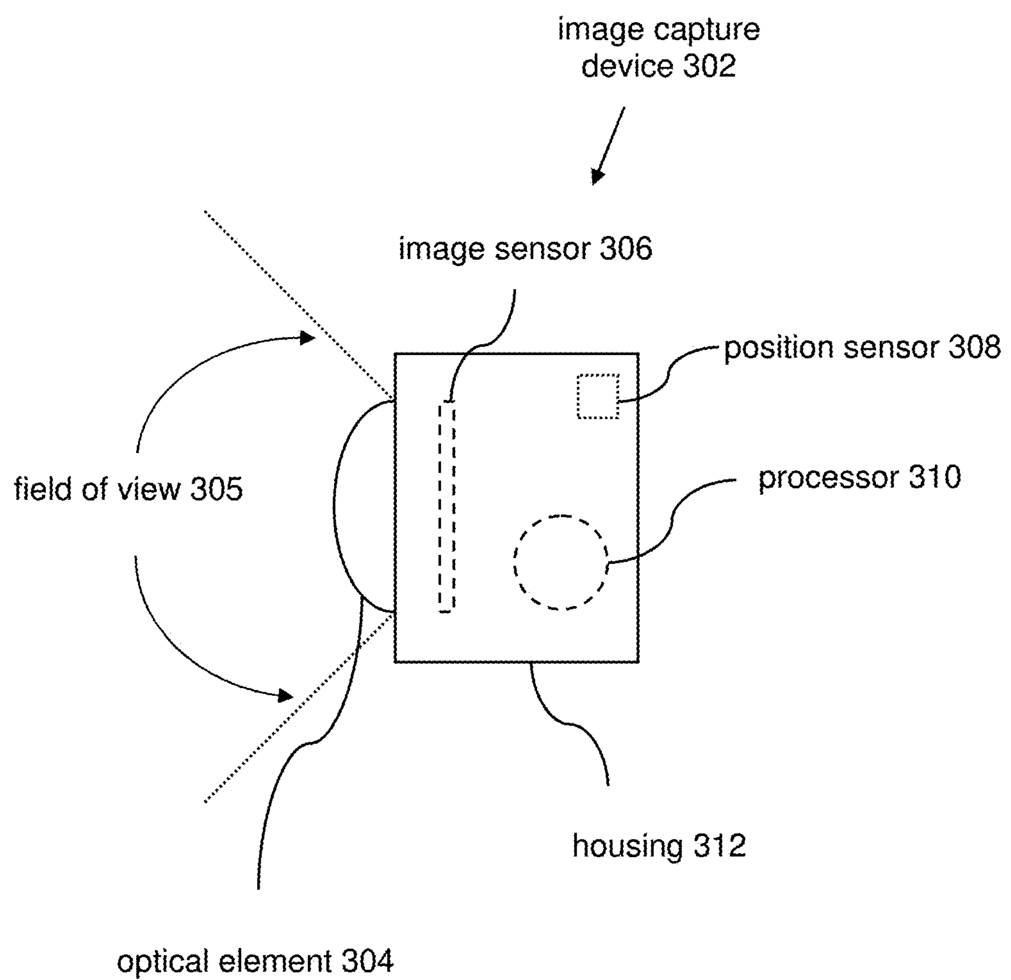
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. In some implementations, an image capture device may include multiple optical elements and/or multiple image sensors. The combined field of view of the optical elements may include a spherical field of view. The multiple optical elements and/or multiple image sensors may be used to capture spherical visual content. Spherical visual content may include a spherical field of view. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate stabilized visual content. Portions of the visual content captured from light within the field of view 305 may be presented on a display and/or used to generate a video. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not appear shaky/jerky or appears less shaky/jerky. For example, the shape, size, and/or the location of the viewing window within the field of view of the visual content may be determined to compensate for motion of the image capture device 302 during capture such that the video appears to have been captured from an image capture device 302 with less motion. That is, the visual content captured by the image capture device 302 may be cropped to generate stabilized visual content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The visual content captured at different moments within the capture duration may be included within images. The images may include a first image including the visual content captured at a first moment within the capture duration, a second image including the visual content captured at a second moment subsequent to the first moment within the capture duration, and/or other images. For example, the images captured by the image capture device within a capture duration may form a sequence of images/video frames that form the content of a video.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information that characterizes positions of the image capture device 302 as the function of progress through the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. In some implementations, the position information may characterize translational and/or rotational positions of the image capture device 302 by characterizing changes in translational and/or rotational positions (motion) of the image capture device 302 during the capture duration, and vice versa.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of the image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the position information to stabilize visual content captured through the optical element 304 and/or the image sensor 306. Visual content of images may be captured by the image capture device 302 during a capture duration. The rotational and/or translational positions of the image capture device 302 corresponding to the images (the positions of the image capture device 302 when it captured the images) during the capture duration may be determined based on the position information and/or other information. The rotational and/or translational positions of the image capture device 302 may be determined as a function of progress through the capture duration.

Smoothed rotational and/or smoothed translational positions of the image capture device 302 corresponding to the image may be determined based on a look ahead of a rotation constraint and/or other information. The smoothed rotational and/or smoothed translational positions of the image capture device 302 may be determined as the function of progress through the capture duration. The smoothed rotational and/or smoothed translational positions of the image capture device 302 as the function of progress through the capture duration may be used to determine placement (e.g., size, shape, position, rotation) of the viewing window within the field of view of the visual content. For example, placement of the viewing window within the field of view of the visual content may include one or more of changing the size of the viewing window, changing the shape of the viewing window, and/or changing the location of the viewing window within the field of view based on the smoothed positions of the image capture device 302 as the function of progress through the capture duration.

The look ahead of the rotation constraint may include determination of whether the rotation constraint is violated for one or more subsequent images to determine a smoothed rotational position and/or a smoothed translational position corresponding an individual image. The look ahead of the rotation constraint may use determination of whether smoothing of position for an image based on a smoothing window of a given size (width for applying filter to smoothed the positions) results in the rotation constraint being satisfied or violated for a subsequently captured image to determine whether the given size of the smoothing window should be used.

The smoothed positions of the image capture device 302 may be used to stabilize the visual content. Stabilization of visual content may include reduction/removal of motion present in the visual content due to motion (e.g., mechanical displacement, rotational motion, translational motion) of the image capture device 302 during visual content capture.

In some implementations, the visual content may be stabilized via one or more punchouts of the visual content and/or other information. For instance, the smoothed positions of the image capture device 302 may be used to determine a viewing window for stabilization of the visual content. For example, smoothed rotational positions and/or smoothed translational positions of the image capture device 302 may be used to determine a viewing window for stabilization of the visual content. The viewing window may define the extent(s) of the images that is to be punched out to stabilize the visual content. The stabilized visual content may include a punchout of the extent(s) of the images within the viewing window. The stabilized visual content may include cropped extents of the visual content, with the viewing window defining the extents of the visual content that is cropped out.

Stabilization of visual content may be performed based on placement of the viewing window within the field of view of the visual content. The placement of the viewing window may compensate for the motion of the image capture device 302 during the capture duration. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame).

Figure 4A:
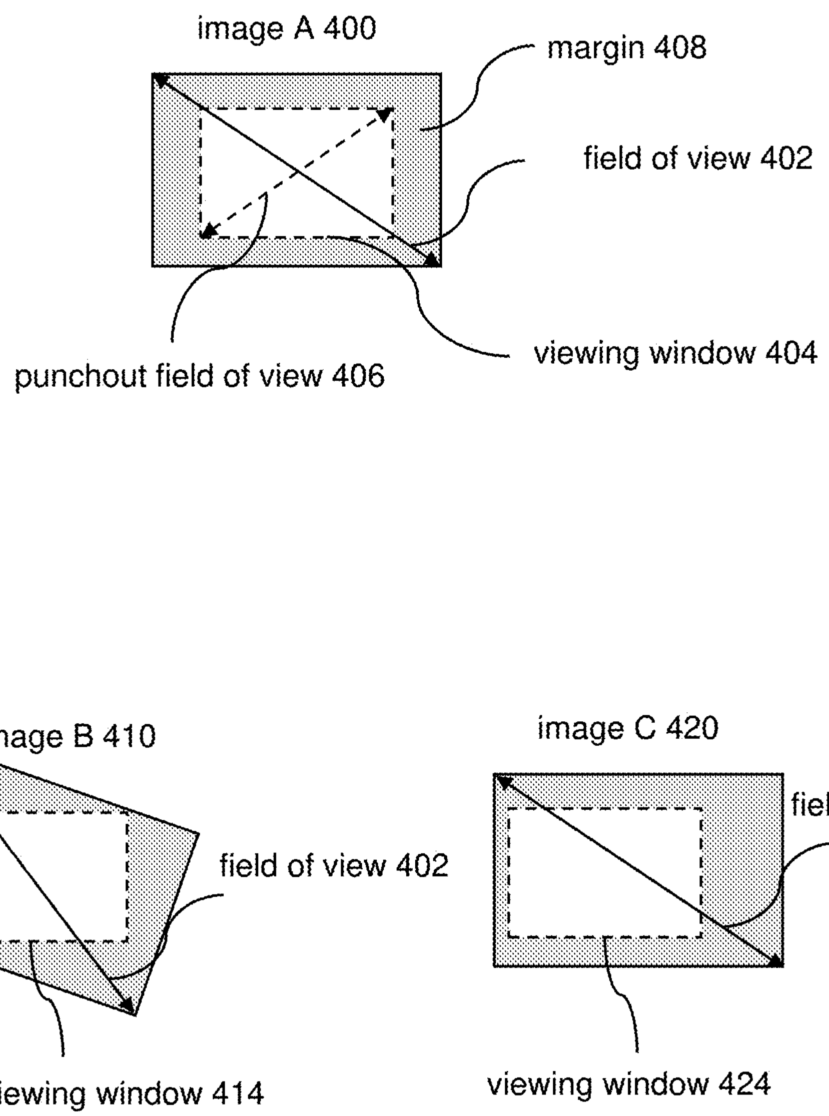
FIG. 4A illustrates example orientations of viewing windows with respect to images.

For example, FIG. 4A example orientations of viewing windows 404, 414, 424 with respect to images 400, 410, 420. The images 400, 410, 420 may have a field of view 402. The viewing windows 404, 414, 424 may have a punchout field of view 406. The images 400, 410, 420 may include capture of a scene within an angle defined by the field of view 402. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a margin 408 within which the viewing window 404 may move with respect to the image A 400/field of view 402. The margin 408 may specify how much the viewing window 404 may move while remaining inside the field of view 402 of the visual content included within the image A 402.

Placements of the viewing window 404, 414, 424 within the field of view 402 (orientation of the viewing window 404 with respect to the field of view 402) may be changed to perform video stabilization. For example, the viewing window 414 may be rotated with respect to the field of view 402 of the image B 410 while not going beyond the pixels captured within the image B 410. The viewing window 424 may be laterally moved with respect to the field of view 402 of the image C 420 while not going beyond the pixels captured within the image C 420. The placements of the viewing window 404, 414, 424 may be determined based on the rotational positions of the image capture device when the images 400, 410, 420 were captured.

For instance, the viewing window 414 may be oriented with respect to the field of view 402 of the image B 410 to provide a punchout of the image B 410 that is stable with respect to a prior and/or next punchout of the images (e.g., stable with the punchout of the image A 400 using the viewing window 404 for the image A 400). The orientation of the viewing window 414 with respect to the field of view 402 of the image B 410 may be determined based on the rotational position of the image capture device from which the image B 410 was captured. Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

In some implementations, the visual content may be stabilized via one or more modifications of the visual content and/or other information. For instance, the smoothed positions of the image capture device 302 may be used to modify the visual content for stabilization of the visual content. For example, smoothed rotational positions and/or smoothed translational positions of the image capture device 302 may be used to modify the visual content for stabilization of the visual content.

Such stabilization of the visual content may include changes to the visual content itself (and/or creating a modified version/copy of the visual content) to provide stabilized visual content that is more stable than the original visual content. Modification of the visual content may include one or more changes to visual characteristics of the visual content, such as one or more changes in pixel locations and/or pixel intensities. Modification of the visual content may include one or more of rotation of the visual content, warping of the visual content, and/or other modification of the visual content. Rotation of the visual content may include change in how the visual content is oriented. The visual content may be rotated to compensate for different rotational positions of the image capture device during the capture duration. Warping of the visual content may include visual manipulation of one or more portions of the visual content. Visual content may be warped to compensate for different perspectives captured within the visual content due to motion of the image capture device during the capture duration. Visual content may be warped to provide rolling shutter compensation. The modification of the visual content may be performed in the sensor space/3D space and the modified visual content may be projected into image space/2D space using one or more projections (e.g., spherical projections, such as equirectangular projection, equi-angular cubemap projection, stereographic projection).

Figure 4B:
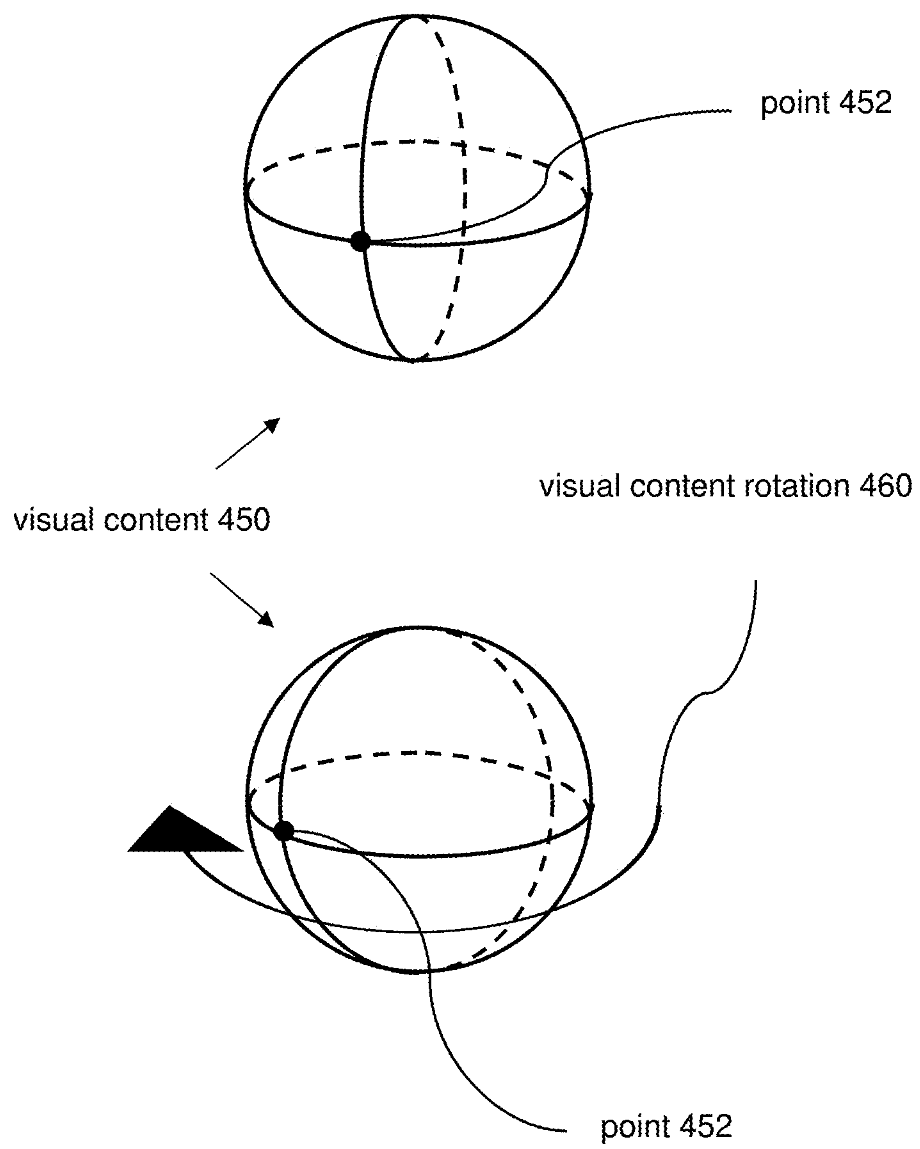
FIG. 4B illustrates example rotation of visual content.

FIG. 4B illustrates example rotation of visual content 450. The visual content 450 may include a wide-angle visual content, such as spherical visual content. Spherical visual content may include full spherical visual content (360 degrees of capture) or partial spherical visual content (less than 360 degrees of capture). Partial spherical visual content may be referred to as panoramic visual content. During capture of the visual content 450, the image capture device may have experienced motion. For example, the image capture device may have rotated. To compensate for the rotation of the image capture device during capture duration, the visual content 450 may be rotated to the right, as shown by visual content rotation 460. The visual content rotation 460 may cause a point 452 within the visual content 450 to be moved to the right. The rotation of the visual content 450 may compensate for changes in rotational positions of the image capture device during the capture duration. The rotation of the visual content 450 may inverse some or all of the motion of the image capture device during the capture duration. For example, the image capture device may move by certain amounts about the yaw, pitch, and/or roll axes, and the visual content 450 may be rotated in the corresponding direction so that the visual content appears to have been captured by a still (e.g., not rotating) image capture device.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

For example, the processor 11 (or one or more components of the processor 11) may obtain visual information defining visual content having a field of view, position information characterizing positions of an image capture device at different moments within a capture duration, and/or other information. One or more information may be obtained during acquisition of the visual content and/or after acquisition of the visual content by an image capture device. For example, visual information, position information, and/or other information may be obtained while the visual content are being captured by an image capture device and/or after the visual content have been captured and stored in memory (e.g., the electronic storage 13).

The position component 102 may be configured to determine the positions of the image capture device corresponding to the images based on the position information and/or other information. The position component 102 may be configured to determine the positions of the image capture device based on the position information characterizing specific translational and/or rotational positions of the image capture device/housing and/or changes in translational and/or rotational positions of the image capture device/housing as a function of progress through the capture duration.

The positions of the image capture device as the function of progress through the capture duration may be determined. The positions of the image capture device may include positions of the image capture device at different moments within the capture duration. The positions of the image capture device may include rotational positions (e.g., rotations about one or more axis of the image capture device) and/or translational positions of the image capture device/housing of the image capture device. For example, the position component 102 may be configured to determine the rotational positions of the image capture device corresponding to the images based the position information and/or other information. The rotational positions may include a first rotational position corresponding to a first image captured at a first moment within the capture duration, a second rotational position corresponding to a second image captured at a second moment subsequent to the first moment within the capture duration, and/or other rotational positions corresponding to other images.

Figure 5A:
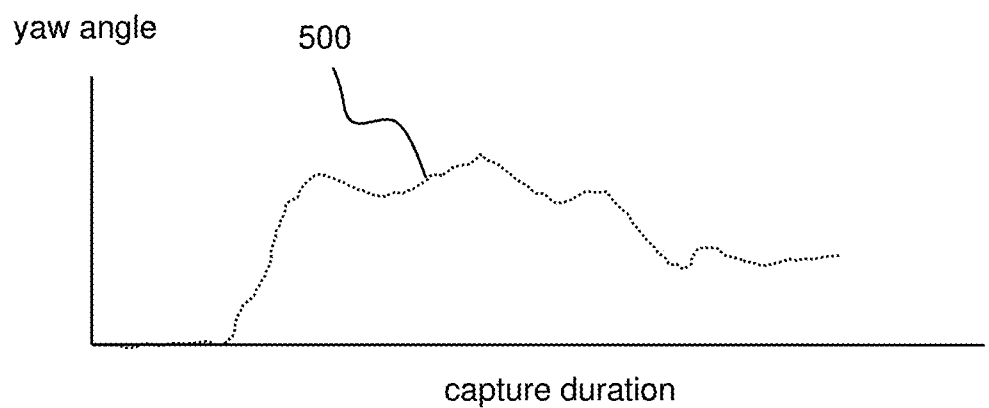
FIG. 5A illustrates example rotational positions of an image capture device as a function of progress through a capture duration.

FIG. 5A illustrates example rotational positions 500 of an image capture device as a function of progress through a capture duration. The rotational positions 500 may include yaw rotational position of the image capture device over the capture duration. The rotational positions 500 may reflect yaw angle positions (e.g., rotational positions defined with respect to a yaw axis, rotation to the left or right) of the image capture device at different moments within the capture duration. Other types of positions (e.g., pitch angle positions, roll angle positions, translational positions) of the image capture device are contemplated.

Generating a video including visual content (e.g., of image(s), of video frame(s), of video(s)) captured along the rotational positions 500 may be undesirable. For example, generating a video by outputting the images captured along the rotational positions 500 may result in a video with footage that is shaky and/or that appears to include unintended camera motion. For instance, sharp/quick changes in the yaw angle positions of the image capture device may result in abrupt changes in the direction of visuals within the video (e.g., quick left or right camera motion). Multiple changes in the yaw angle positions of the image capture device may result in a footage that is changing the direction of view.

Stabilized visual content may be generated to provide a smoother view of the captured visual content. In some implementations, stabilization may include using smaller portions/extents of the visual content to provide a punchout view of the visual content that creates a more stable view than when viewing the entirety of the visual content. Generation of stabilized visual content may include using smaller visual portions of the captured visual content (e.g., smaller visual portions of images/video frames) to provide a punchout view of the captured visual content. The stabilized visual content may provide a more stable view of the captured visual content than when the entirety of the captured visual content is presented.

For example, such stabilization may be provided by smoothing the rotational positions of the image capture device over the capture duration and determining the punchouts from the visual content based on the smoothed rotational positions. A punchout of visual content may refer to using one or more portions of the visual content for presentation, such as a cut-out of the image or a cropped portion of the image. A punchout of visual content may include one or more portions of the visual content presented on a display and/or one or more portions of the visual content used to generate video frames of video content.

Figure 5B:
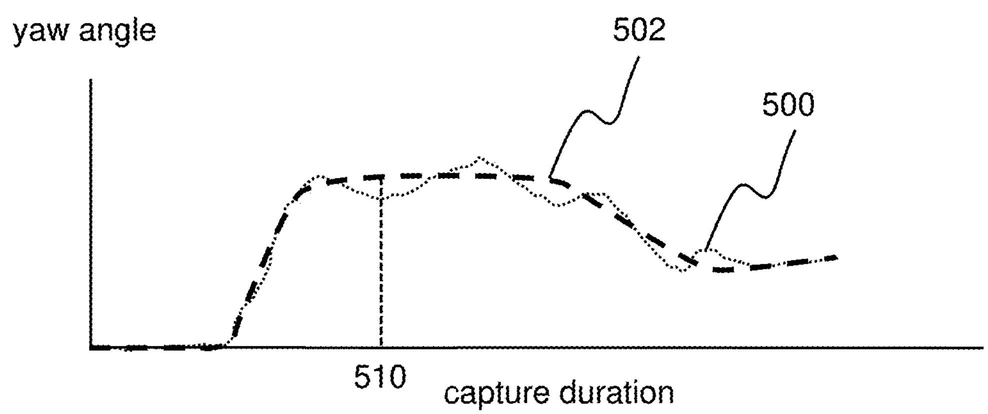
FIG. 5B illustrates example smoothed rotational positions of an image capture device as a function of progress through a capture duration.

However, simply smoothing the rotational positions of the image capture device may result in the viewing window extending beyond the field of view of the captured visual content. For example, FIG. 5B illustrates example smoothed rotational positions 502 of an image capture device as a function of progress through a capture duration. The smoothed rotational positions 502 may result in the viewing window for the visual content violating a rotation constraint. A rotation constraint may refer to one or more limitations and/or restrictions in how the viewing window for providing punchout of the visual content may be placed with respect to the field of view of the visual content and/or moved within the field of view of the visual content. For example, a rotation constraint may require that the viewing window be bounded by the field of view of the visual content (e.g., crop constraint). The rotation constraint may require that the entirety of the viewing window be located within the field of view of the visual content. The rotation constraint may be violated based on the viewing window extending beyond the field of view of the visual content included within the images/video frames and/or other information. The rotation constraint may be satisfied based on the viewing window not extending beyond (being located within) the field of view of the visual content and/or other information.

The viewing window extending beyond the field of view of the visual content (included within images/video frames) may result in the punchout not include sufficient information to properly stabilize the visual content. The viewing window extending beyond the field of view of the visual content may result in one or more portions of the punchout missing pixels from which the stabilized visual content may be generated. For example, referring to FIG. 4, if one or more of the viewing windows 404, 414, 424 extends beyond the field of view 402 of the images 400, 410, 420, the portion(s) of the viewing windows 404, 414, 424 that extends beyond the field of view 402 may not include any pixels from which the stabilized visual content may be generated. Such placement of the viewing window may result in defects/artifacts within the stabilized visual content, such as black pixels, warping, and/or other defects/artifacts.

The viewing window may extend beyond the field of view of the visual content based on the difference between the rotational positions and smoothed rotational positions of the image capture device, the difference between the size of the field of view of the visual content and the size of the viewing window, and/or other information. Greater amount of differences between the rotational positions and smoothed rotational positions of the image capture device may result in greater movement of the viewing window away from the center of the field of view of the visual content. Greater amount of differences between the size of the field of view of the visual content and the size of the viewing window may enable greater movement of the viewing window from the center of the field of view of the visual content. For example, referring to FIG. 4, the margin 408 may specify how much the viewing window 404 may move while remaining inside the field of view 402 of the visual content. Larger margins may enable the viewing window to move to a greater extent than smaller margins.

Large difference between the rotational positions and smoothed rotational positions of the image capture device may result in the viewing window extending beyond the field of view of the visual content and violating the rotation constraint. For example, referring to FIG. 5A, the rotational positions 500 and the smoothed rotational positions 502 may include a certain amount of difference at a moment 510 within the capture duration. The moment 510 may correspond to the moment at which visual content of a particular image/video frame was captured. The difference between the rotational positions 500 and the smoothed rotational positions 502 may result in the viewing window for the moment 510 (for the visual content captured at the moment 510) extending beyond the field of view of the visual content and violating the rotation constraint.

As another example, a rotation constraint may require that the viewing window be bounded by a virtual boundary within the field of view of the visual content (e.g., virtual crop constraint), may require that the translational and/or rotational motion of the viewing window between subsequent images/video frames be limited to one or more extents (e.g., limitations on extent of changes in rotational and/or rotational positions of the viewing window), and/or otherwise constrain how the viewing window may be placed within the field of view of the visual content. For instance, visual content may include spherical visual content. Spherical visual content may include capture of full spherical field of view and may not have a crop constraint. Stabilization parameters for the spherical visual content may place limits on in what directions and/or rotations the viewing window may be placed within the field of view of the visual content. For example, stabilization parameters may restrict the placement of the viewing window using one or more virtual boundaries and/or limit how much the direction and/or rotation of the viewing window may change between images/video frames (e.g., limitations on changes in relative positions of the viewing window as a function of progress through a capture duration).

As another example, a rotation constraint may be defined and/or set based on limitations of the computing device performing stabilization. The rotation constraint may set limits on the amount of modification to be performed on the visual content based on the limitations of the computing device performing the stabilization. For example, the extent of stabilization able to be performed may be limited by the computing device performing the stabilization. For instance, an image capture device may stabilize spherical visual content during capture by modifying the spherical visual content (e.g., spherical visual content rotation/warping). The image capture device may have limited resources (e.g., hardware, processor, memory) and may not be able to fully modify the spherical visual content to perform full stabilization. For example, a processor (e.g., CPU, GPU) of the image capture device may not have sufficient computing capability to fully rotate and/or warp the spherical visual content to compensate for motion experienced by the image capture device during capture of the spherical visual content.

However, performing limited stabilization of the visual content may be beneficial. For example, limited stabilization of the visual content may reduce the amount of changes in pixels between sequential images and may facilitate encoding of the visual content. Reducing the amount of pixel changes in sequential images may reduce the storage size of the encoded visual content. In some implementations, one or more additional stabilizations may be performed after limited (partial) stabilization is performed by the image capture device. For example, one or more stabilizations may be performed in viewer software to perform additional/full stabilization after limited (partial) stabilization is performed by the image capture device.

In some implementations, multiple stabilization techniques/algorithms may be performed to perform stabilization. For example, multiple stabilization techniques/algorithms may be performed in a sequence and/or chained together to performed stabilization. Different stabilization techniques/algorithms may have different constraints. For instance, hardware of the image capture device may not have/may have less limitation on performing roll rotations of the visual content than other rotations/modifications of the visual content. One or more roll stabilization techniques/algorithms may be performed to stabilize a single axis, with dynamic smoothing that filters three axis in the same way.

The rotation constraint may require that the viewing window and/or the modification of the visual content respect the stabilization parameters for the visual content. The rotation constraint may be violated based on the viewing window and/or the modification of the visual content not respecting one or more constraints for stabilization of the visual content. For example, the rotation constraint may be violated based on the viewing window extending beyond a virtual boundary, the motion of the viewing window being greater than maximum allowed motion for stabilization, the modification of the visual content being greater than maximum allowed/set for stabilization, and/or other information. The rotation constraint may be satisfied based on the viewing window and/or the modification of the visual content respecting the constraint(s) for stabilization of visual content and/or other information. Other rotation constraints are contemplated.

Violation of the rotation constraint may be reduced/eliminated by smoothing the rotational positions of the image capture device using a smaller smoothing window. A smoothing window may refer to a range of rotational positions that are smoothed at the same time. A smoothing window may refer to a range of rotational positions for which one or more filters are applied for smoothing. The size of the smoothing window may refer to the extent of rotational positions covered by the smoothing window. The size of the smoothing window may correspond to the number of the rotational positions of the image capture device that are smoothed to determine the smoothed rotational positions of the image capture device. For example, the size of the smoothing window may refer to the width of rotational positions for applying filter(s) to smooth the rotational positions. Smaller sizes (width) of the smoothing window may result in smaller differences between the rotational positions and smoothed rotational positions. Larger sizes (width) of the smoothing window may result in larger differences between the rotational positions and smoothed rotational positions.

Figure 5C:
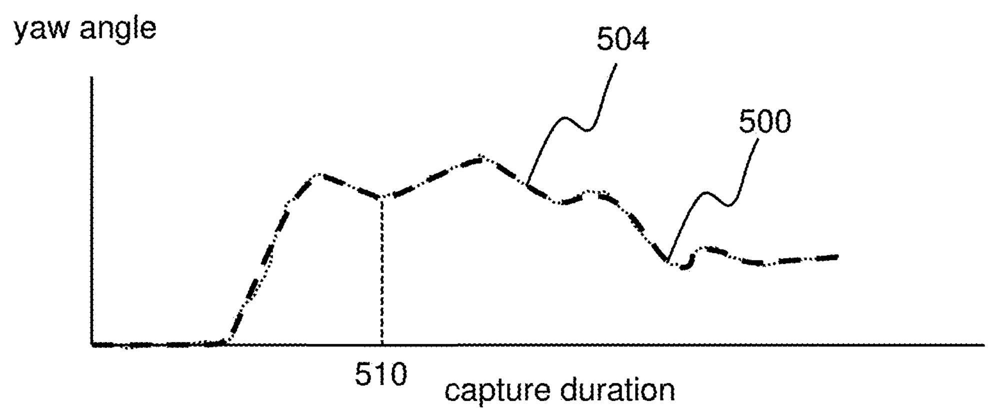
FIG. 5C illustrates example smoothed rotational positions of an image capture device as a function of progress through a capture duration

For example, FIG. 5C illustrates example smoothed rotational positions 504 of an image capture device as a function of progress through a capture duration. The size of the smoothing window for generating the smoothed rotational positions 504 may be smaller than the size of the smoothing window for generating the smoothed rotational positions 502 (shown in FIG. 5B). The smoothed rotational positions 504 may have a smaller difference from the rotational positions 500 than the smoothed rotational positions 502 at the moment 510. The difference between the rotational positions 500 and the smoothed rotational positions 504 may result in the viewing window for the moment 510 (for the visual content captured at the moment 510) not extending beyond the field of view of the visual content and satisfying the rotation constraint.

However, use of the smaller smoothing window for the entirety of the capture duration may not be desirable. Use of the smaller smoothing window may result in less stabilization of the visual content. The size of the smoothing window may be varied over the capture duration to take advantage of both larger and smaller smoothing windows. Larger smoothing window may be used to provide greater stabilization of the visual content when possible, and smaller smoothing window may be used to avoid violation of the rotation constraint. Simply changing the size of the smoothing window at the moment that the rotation constraint is violated may result in discontinuity in the smoothed rotational positions, which may result in drastic/rapid movement of the viewing window. Such movement of the viewing window may result in unpleasant (e.g., jerky) movement within the stabilized visual content.

The changes in the size of the smoothing window may be limited to provide gradual changes in the size of the smoothing window. Limiting the change in size of the smoothing window may enable determination of smoothed rotational positions of the image capture device that are continuous over the capture duration.

The smoothed position 104 component may be configured to determine smoothed positions of the image capture device corresponding to the images based on a look ahead of a rotation constraint and/or other information. The smoothed position 104 component may be configured to determine smoothed rotational positions and/or smoothed translational positions of the image capture device corresponding to the images based on a look ahead of a rotation constraint and/or other information. The smoothed rotational positions and/or smoothed translational positions of the image capture device may be determined as a function of progress through the capture duration.

The smoothed positions of the image capture device may refer to positions (e.g., rotational positions, translational position) to be used in determining which portions of the visual content (punchouts) may be used to generate stabilized visual content. The smoothed positions may be used to determine the viewing window from which punchouts of the visual content are generated. The placement of the viewing window within the visual content (e.g., the orientation of the viewing window with respect to the field of view of the visual content, the shape of the viewing window, the size of the viewing window) may be determined based on the smoothed positions of the image capture device. The smoothed positions may be used to determine the modification of the visual content. The type and/or extent of modifications of the visual content may be determined based on the smoothed positions. For instance, smoothed positions may provide information on direction and/or amount by which a viewing window deviates from the center of the field of view of the visual content and/or direction and/or amount by which the visual content is rotated, warped, and/or modified.

The smoothed positions may reflect actual and/or virtual positions of the image capture device at different moments within the capture duration. An actual position may refer to a position that was taken by the image capture device during visual content capture. A virtual position may refer to a position that was not taken by the image capture device during visual content capture. A virtual position may be offset (rotationally and/or translationally) from the actual position of the image capture device.

A curve of smoothed positions may reflect the smoothed positions of the image capture device as a function of progress through the progress length. A curve of positions may reflect positions of the image capture device as a function of progress through the progress length. The curve of smoothed positions may smoother changes in the positions of the image capture device than the curve of positions of the image capture device. That is, the curve of smoothed positions may have less jitters (slight irregular movement/variation), less abrupt changes, and/or less discontinuous changes in the positions (rotational positions, translational positions) of the image capture device than the curve of positions of the image capture device. The curve of smoothed positions having smoother changes in positions than the curve of positions may include high frequency changes in the positions (rotational positions, translational positions) of the image capture device removed from the curve of smoothed positions. That is, the curve of smoothed positions may not include and/or may have fewer high frequencies changes in rotational and/or translational positions of the image capture device than the curve of positions of the image capture device.

The look ahead of the rotation constraint may include determination of whether the rotation constraint is violated for one or more subsequent images to determine a smoothed position corresponding an individual image. For example, a smoothed rotational position corresponding to an image captured at a moment within the capture duration may be determined based on determination of whether the rotation constraint is violated for one or more images captured subsequent to the image. The satisfaction/violation of rotation constraint for image captured in the "future" may be used to determine how the position corresponding to an image captured in the "present" may be smoothed. Using the rotation constraint for "future" images may enable determination of smoothed positions that takes into account future positions of the image capture device. For example, when determining the smoothed rotational position for an image captured at a moment (e.g., 1000th video frame) within the capture duration, the positions/smoothed positions of the image capture device for a duration subsequent to the moment (e.g., corresponding to the next 30 video frames, corresponding to next second of capture) may be analyzed to determine whether a particular smoothing of the rotational position for the image captured at the moment will result in satisfaction or violation of the rotation constraint for the future images.

Use of the look ahead of the rotation constraint may allow for border management that determines the smoothed positions of the image capture device while respecting the rotation constraint. To smooth the position of the image capture device at a moment, a number of positions of the image capture device subsequent to the moment (e.g., positions corresponding to 30 "future"/subsequently captured images/video frames) may be analyzed to determine whether the rotation constraint is violated (detecting future rotation constraint collision) or satisfied for subsequent moments. For example, the rotation constraint may be violated for a moment/image based on the viewing window for an image extending beyond the field of view of the visual content included within the image, the viewing window for an image violating the constraint(s) for stabilizing the image, and/or other information. The rotation constraint may be satisfied for a moment/image based on the viewing window not extending beyond (being located within) the field of view of the visual content, the viewing window respecting the constraint(s) for stabilizing the image, and/or other information.

In some implementations, the determination of the smoothed positions of the image capture device corresponding to the images based on the look ahead of the rotation constraint may include one or more adjustments of a size of a smoothing window for smoothing the positions of the image capture device. The determination of the smoothed positions of the image capture device corresponding to the images based on the look ahead of the rotation constraint may include dynamically changing the size of the smoothing window (dynamically change the width of the smoothing filter) based on whether the rotation constraint is violated or satisfied for one or more subsequent images.

The size of the smoothing window may be adjusted based on the determination of whether the rotation constraint is violated for the subsequent image(s) and/or other information. The size of the smoothing window may correspond to a number of the positions (e.g., rotational positions, translational positions) of the image capture device that are smoothed to determine the smoothed positions of the image capture device. The size of the smoothing window may refer to a range of positions for which one or more filters are applied for smoothing. The size of the smoothing window may refer to the extent of positions covered by the smoothing window. The size of the smoothing window may be referred to as "smoothness." Smaller smoothness may result in smoothed positions that are closer to the observed positions of the image capture device. Larger smoothness may result in smoothed positions that may deviate farther from the observed positions of the image capture device Smoothness of zero may result in the smoothed positions being the same as the observed positions. For example, smoothness of zero may result in the smoothed rotational positions being the same as the observed rotational positions. A smoothed rotational position that is the same as the observed rotational positions may result in the rotation constraint being satisfied. That is, whether the rotation constraint is satisfied or not may not need to be checked (e.g., calculated, computed) because smoothness of zero for an image may always results in the rotation constraint for the image being satisfied.

The smoothing window may include a number of preceding positions of the image capture device and a number of subsequent positions of the image capture device. The number of preceding positions of the image capture device within the smoothing window may be the same as or different from the number of subsequent positions of the image capture device within the smoothing window. For example, the smoothing window may be centered at a rotational position being smoothed, and the number of preceding rotational positions of the image capture device within the smoothing window may be the same as the number of subsequent rotational positions of the image capture device within the smoothing window.

To generate stabilized visual content with continuous movement, the change in smoothness may be progressive. That is, rather than having discontinuous changes in the smoothness, the smoothness may be restricted from changing beyond a set limit. For example, the number of subsequent rotational positions of the image capture device within the smoothing window may be allowed to change by one position between subsequent images. For example, if the smoothness for an image capture at a moment is five, then the maximum smoothness for the following image may be six (the smoothing window includes six subsequent rotational positions of the image capture device) and the minimum smoothness for the following image may be four (the smoothing window includes four subsequent rotational positions of the image capture device). The number of preceding rotational positions of the image capture device within the smoothing window may stay the same or change based on the change in smoothness. For example, maximum smoothness may be thirty (the smoothing window includes, at maximum, thirty subsequent rotational positions of the image capture device). The smoothness of thirty may result in the smoothing window include thirty preceding rotational positions of the image capture device within the smoothing window. If the smoothness is adjusted to twenty-nine, the number of preceding rotational positions of the image capture device within the smoothing window may be reduced (e.g., to twenty-nine) or remain the same at thirty.

Thus, the size of the smoothing window may be adjusted by incrementing or decrementing the number of the positions of the image capture device included within the size of the smoothing window. For example, two images may be adjacent video frames. The size of the smoothing window may include a first size for the first image (first video frame) and a second size for the second image (second video frame). The second size for the second image may be determined based on copying, incrementing, or decrementing the first size for the first image. That is, the size of the smoothing window for the second video frame may be the same as the size of the smoothing window for the first video frame, less than the size of the smoothing window for the first video frame by one, or greater than the size of the smoothing window for the first video frame by one. In some implementations, the size of the smoothing window may be allowed to change by other amounts between images. Increasing the limit on the allowed change of smoothness between images may increase the potential for discontinuous movement within the stabilized visual content.

The size of the smoothing window may be adjusted such that the rotation constraint is satisfied for the subsequent image(s). That is, the smoothness for images may be adjusted so that the look-ahead of the rotation constraint is satisfied for the number of “future” images within the smoothing window. If the rotation constraint is not satisfied for one or more of the subsequent (future) images within the smoothing window, the smoothness may be decreased.

In some implementations, geometric variation, rather than arithmetic variation, may be used for change in smoothness. For example, the change in smoothness may be implemented through geometric variation rather than arithmetic variation when the smoothness approaches zero. Geometric variation may allow for more progressive changes in smoothness at low values of smoothness. For instance, rather than using a filter of width N for smoothness N, a filter having width that is lower than N and more geometric progression may be used.

The size of the smoothing window may be adjusted to maximize the size of the smoothing window while satisfying the rotation constraint. That is, the smoothness for images may be increased if the rotation constraint is satisfied when one or more additional more “future” images are included within the smoothing window. If the look-ahead of the rotation constraint is satisfied for an image while using the smoothness of a preceding image, the smoothness may be increased and the look-ahead of the rotation constraint may be used to determine whether the additional future image(s) satisfy the rotation constraint. If so, the increased smoothness (wider filter width) may be used.

The positions of the image capture device within the smoothing window may be smoothed using one or more filters. For example, a triangle filter may be used to minimize acceleration between the smoothed positions. A step response of a triangle filter may show a constant acceleration between the step and a constant deceleration after the step. As another example, a rectangular filter may be used to minimize speed between the smoothed positions.

The look ahead of the rotation constraint may include use of a number of “future” image capture positions to analyze the smoothness for the present images as well as the smoothness for the “future” images. The positions of the “future” images may be obtained by delaying the stabilization of the visual content. That is, rather than stabilizing visual content of an image when the image is captured, the visual content of the image may be stabilized after a number of subsequent images are captured and the corresponding image capture device positions are observed (by one or more position sensors).

The number of possible smoothness analysis may decrease by one with each subsequently captured image. For example, obtained position information may include position information for the image being stabilized and position information for N “future” images. Thus, N “future” image capture device positions (e.g., image capture device orientation) may be available for stabilization of the “current” image (image for which smoothness is being determined). N “future” positions may enable analysis of smoothness of N for the current image P, N−1 for the future image P+1, N−2 for the future image P+2, and so forth, until analysis of smoothness of 1 for future image P+N−1. For individual smoothness analysis, the satisfaction or violation of the rotation constraint may be determined. Based on future rotation constraint satisfaction or violation, the smoothness may be changed (e.g., +1, 0, −1) while respecting future rotation constraint and maximizing the smoothness.

FIG. 6A illustrates example analysis of smoothness using a look ahead of a rotation constraint. P may represent the “current” image (e.g., video frame) for which smoothness is being determined. The smoothed orientation of image P with smoothness of S may be defined as a convolution filter from orientations (rotational positions) of images P−S to images P+S:

$$SO(P,S)=\text{filter}(\text{from } O(P-S) \text{ to } O(P+S))=C$$

Smoothness of zero may result in the smoothed orientation being the same as the original orientation and may always satisfy the rotation constraint C.

$$SO(n,0)=O(n)$$

$$C(SO(n,0))=OK$$

The goal of the look ahead of the rotation constraint may include identifying the maximum smoothness values S(n) that satisfy the rotation constraints, with the smoothness value variation being one of +1,0 or −1. Other variations are contemplated:

$$C(SO(n,S(n)))=OK$$

$$|S(n)-S(n-1)|<=1$$

For example, image capture device positions for image P through P+5 may be available. The maximum smoothness that may be analyzed may be five. FIG. 6A may illustrate which smoothed rotational positions may be computed during smoothness analysis of image P. For image P, smoothed rotational positions and whether the smoothed rotational positions satisfy or violate the rotation constraint may be computed for smoothness ranging from one to five. Smoothness of zero does not need to be computed because smoothness of zero will result in the rotation constraint being satisfied. For image P+1, smoothness ranging from one to four may be analyzed. For image P+2, smoothness ranging from one to three may be analyzed. For image P+3, smoothness ranging from one to two may be analyzed. For image P+4, smoothness of one may be analyzed.

A function OK(n, s) may be defined to be true when the smoothed rotational potion of an image n with smoothness of s satisfies the rotation constraint:

$$OK(n,s)=C(SO(n,s))$$

A function T(N, s) may be defined to be combination of the function OK(n+x, s−x), where x ranges from zero to s−1.

$$T(n,s)=\text{AND}(OK(n+x,\ s-x))\ (x\text{ from }0\text{ to }s-1)$$

For example, T(n, 4)=OK(n,4) and OK(n+1,3) and OK(n+2,2) and OK(n+3,1).

For the look-ahead of the rotation constraint for an image n to be satisfied, the function T(n,S(n)) may need to be OK. That is, the look-ahead of the rotation constraint for an image n may be satisfied based on the function T(n,S(n))=OK.

The smoothness of the current image P may be determined based on the smoothness of the preceding image P−1. The smoothness of the preceding image may be known (e.g., from prior calculation). If there is no preceding image, a default value may be used for the smoothness of the “preceding” image P−1 or the smoothness of the current image P may be determined to be the maximum smoothness that satisfies the rotation constraint for the image P and future images.

The smoothness of P, S(P), may have one of three values: S(P−1)−1, S(P−1), S(P−1)+1, between the maximum and minimum smoothness. Between the three values, the smoothness of P may be determined to be the maximum value that satisfies T(P, S(P)). That is, the smoothness of P may be determined to be the maximum value that allows the rotation constraint to be satisfied for P, P+1, . . . , and P+S(P)−1.

FIG. 6B illustrates example analysis of smoothness using a look ahead of a rotation constraint. POK may indicate that a particular smoothness was previously computed as satisfying the rotation constraint (current and future frames satisfy the rotation constraint). PKO may indicate that a particular smoothness was previously computed as violating the rotation constraint (current and/or future frames violate the rotation constraint). In FIG. 6B, the smoothness of the preceding image P−1 may have been determined to be 3 (S(P−1)=3). As shown in FIG. 6B, T(P−1, S(P−1)) is OK. Thus, T(P, S(P−1)−1) is OK and the rotation constraint for S(P−1) need not be checked. That is, decrementing the smoothness of prior image for the current image may result in the rotation constraint for the current image and “future” images being satisfied. Thus, the smoothness of the prior image may always be decremented when determining the smoothness of the current image.

Thus, the analysis of the smoothness using a look ahead of the constraint may proceed as follows. The smoothness of the preceding image may be checked for the current image to see if the rotation constraint is satisfied by all of the “future” images (whether T(P, S(P−1)) is OK). Computation of the smoothness of the preceding image may be represented as C1 in FIG. 6B. If not, then the smoothness of the current image P may be determined by decrementing the smoothness of the preceding image (S(P−1)−1). If the rotation constraint is satisfied by the “future” images, then the smoothness of the preceding image may be incremented and checked to see if the rotation constraint is satisfied by all of the “future” images (whether T(P, S(P−1)+1) is OK). Computation of the incremented smoothness of the preceding image may be represented as C2 in FIG. 6B. If not, then the smoothness of the current image P may be determined to be the same as the smoothness of the preceding image (S(P−1)). If the rotation constraint is satisfied by the “future” images, then the smoothness of the current image P may be determined by incrementing the smoothness of the preceding image (S(P−1)+1).

In FIG. 6B, the smoothness of the preceding image P−1 may have been determined to be 3 (S(P−1)=3). Determination of the smoothness of the image P may include computation of T(P, 3) (shown as C1) and T(P, 4) (shown as C2). Smoothness of 5 for image P need not be computed as it is beyond the range of acceptable smoothness (between 2 and 4).

FIG. 6C illustrates example analysis of smoothness using a look ahead of a rotation constraint. In FIG. 6C, S(0)=3 (smoothness of image P−6 is 3). For image P−5, if T(1,3), use of preceding smoothness of 3, is OK, and T(1,4), use of incremented smoothness of 4, is OK, S(1)=4 (smoothness for image P−5 is 4). For image P−4, if T(2,4), use of preceding smoothness of 4, is OK but T(2,5), use of incremented smoothness of 5, is not OK (because image P−2 at smoothness of 3 results in violation of the rotation constraint), S(2)=4 (smoothness for image P−4 is 4). For image P−3, if T(3,4), use of preceding smoothness of 4, is not OK (because image P−2 at smoothness of 3 results in violation of the rotation constraint), S(3)=3 (smoothness for image P−3 is 3). For image P−2, if T(4,3), use of preceding smoothness of 3, is not OK, S(4)=2 (smoothness for image P−2 is 2). For image P−1, if T(5,2), use of preceding smoothness of 2, is OK, but T(5,3), use of incremented smoothness of 3, is not OK, then S(5)=2 (smoothness for image P−1 is 2). For image P, the preceding smoothness of 2 is tested (C1). If the rotation constraint for “future” images are satisfied, then the incremented smoothness of 3 is tested (C2).

The stabilization technique disclosed herein may provide for stabilized visual content without/with less non-continuous movements. The stabilization technique disclosed herein may be computationally efficient and simple to compute. If the number of known rotational positions in the “future” is F (image capture device orientations are known for images from P to P+F), the number of all possible smoothness values if F. Knowledge of the preceding smoothness allows for 3 possible values for the smoothness of P. Previous computation of rotation constraint violation/satisfaction may be reused when determining smoothness of the current image. The complexity of the stabilization technique disclosed herein may be O(n), linear to F.

The viewing window component 106 may be configured to determine one or more viewing windows for the images based on the smoothed positions (e.g., smoothed rotational positions, smoothed translational positions) of the image capture device and/or other information. The viewing window component 106 may determine viewing window(s) for the visual content included within the images as a function of progress through the capture duration. Placement of a viewing window for the visual content with respect to the field of view of the visual content captured at a moment may be determined based on the corresponding smoothed position (smoothed rotational position, smoothed translational position) of the image capture device and/or other information.

A viewing window may define one or more extents of the images (visual content included within the images). A viewing window may define extent(s) of the images to be included within stabilized visual content. A viewing window may define extent(s) of the images to be included within a punchout of the images as the function of progress through the capture duration and/or a progress length of the visual content. The progress length of the visual content may be the same as or determined based on the capture duration. A viewing window may define extent(s) of the images included within a video generated from the visual content. For example, a viewing window may define which spatial portions of the images captured by the image capture device during the capture duration is presented on display(s) and/or included within stabilized visual content.

A viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. A viewing direction may be defined based on rotation about an axis that defines lateral movement of the viewing window (e.g., yaw). A viewing direction may be defined based on rotation about an axis that defines vertical movement of the viewing window (e.g., pitch). The yaw and pitch values of the viewing direction may determine the location of the viewing window within images.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio).

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation may effectuate rotation of the viewing window within the field of view of the visual content. The rotation of the viewing window may compensate for rotation of the image capture device during capture duration.

The viewing window(s) may be determined as the function of progress through the capture duration. That is, one or more of viewing direction, viewing rotation, and/or viewing size may be determined for different parts of the capture duration. For example, different placement (determined based on viewing direction, viewing rotation, and/or viewing size) of the viewing window may be determined for different parts of the capture duration. The viewing window(s) may be determined for different time points and/or different time durations within the capture duration. The viewing window(s) may be determined for different images/video frames and/or different groups of images/video frames captured during the capture duration.

A viewing window may define extents of the visual content to be included within stabilized visual content. A viewing window may define which portions of the visual content captured at different moments within the capture duration are included within the stabilized visual content. Inclusion of the extents of the visual content defined by the viewing window within the stabilized visual content may effectuate stabilization of the visual content.

A viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content. A viewing window may include projection from one or more image sensors to one or more output image(s) which respects one or more visual, geometrical and/or mathematical properties. For example, viewing window may include one or more spherical projections, such as equirectangular projection, equi-angular cubemap projection, and/or other projections.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length/capture duration of the visual content. A viewing window may correspond to the entire duration of the progress length/capture duration or for one or more portions (e.g., portions including moments of interest) of the progress length/capture duration. The punchout of the visual content may be presented on one or more displays, included in one or more videos, and/or otherwise used for presenting stabilized view the visual content.

Determining a viewing window for visual content based on the smoothed positions (e.g., rotational positions, translational positions) may include determining one or more of viewing direction, viewing rotation, and/or viewing size of the viewing window based on the smoothed positions. That is, determining a viewing window for images may include determining orientations of the viewing window with respect to the field of view of the visual content included within the images based on the smoothed positions. Placement (viewing direction, viewing rotation, and/or viewing size) of the viewing window at different moments may be determined based on corresponding smoothed positions. The orientations of the viewing window with respect to the field of view of the visual content may determine which portions of the visual content (punchouts) may be used to generate a video. That is, the viewing window component 106 may determine how the punchouts for the visual content may be oriented with respect to the field of view of the visual content.

The viewing window component 106 may be configured to determine how the viewing window should be oriented with respect to the field of view of the visual content (images, video frames) based on the smoothed positions. The viewing window component 106 may determine how the punchouts for the visual content may be laterally and/or vertically positioned with respect to the field of view of the visual content based on the smoothed positions. The viewing window component 106 may determine how the punchouts for the visual content may be rotated with respect to the field of view of the visual content based on the smoothed positions.

In some implementation, the viewing window component 106 may be further configured to rotate the visual content to level the visual content based on the rotational positions of the image capture device and/or other information. Rotation of the visual content may be determined for different moments within the progress length of the visual content. The visual content may be rotated to compensate for rotation of the image capture device during the capture duration such that a view of the visual content includes depiction of leveled scene.

In some implementations, the direction of gravity for visual content capture at different may be used to determine the amount of rotation that needs to be applied to the visual content to level the depiction within the visual content. For example, the visual content may be rotated so that the direction of gravity is pointed downwards. The rotation of the visual content may be effectuated through rotation of the visual content itself and/or through orientation of the viewing window with respect to the field of view of the visual content. For example, images captured by the image capture device may be rotated to compensate for rotation of the image capture device before placement of an upright viewing window and/or the viewing window may be rotated within the images (including tilted view of the scene) so that the visual content within the viewing window appears upright.

The generation component 108 may be configured to generate stabilize visual content based on one or more viewing windows and/or other information. The stabilized visual content may include a punchout of the extent(s) of the images within the viewing window(s). Stabilized visual content may be generated as images/video frames including extent(s) of the visual content within the viewing window(s). Stabilized visual content may be generated as outputs of portions of the visual captured by the image capture device, with the outputted portions including extent(s) of the visual content within the viewing window(s). Inclusion of the extent(s) of the visual content within the viewing windows in video may effectuate stabilization of the visual content via selective cropping. The portions of the visual content that are cropped for stabilization may depend on the smoothed rotational positions over the capture duration/as a function of progress through the capture duration, and/or other information.

In some implementations, the generation component 108 may be configured to generate stabilize visual content based on one or more modifications of the visual content and/or other information. Modification(s) of the visual content may include rotation, warping, and/or other modification of the visual content. The modification(s) of the visual content may be determined and/or performed based on the based on the smoothed positions (e.g., smoothed rotational positions, smoothed translational positions) of the image capture device and/or other information. Modification(s) of the visual content for stabilization may be determined and/or performed as a function of progress through the capture duration. Type and/or extent of modifications of the visual content captured at a moment may be determined based on the corresponding smoothed position (smoothed rotational position, smoothed translational position) of the image capture device and/or other information.

In some implementations, the stabilized visual content may be generated as an encoded version/copy of the stabilized visual content (e.g., encoded video file) and/or a director track that defines the extents of the visual content to be used during playback. For example, the stabilized visual content may be generated as video frames in a video file, and the video file may be opened in a video player for presentation of the stabilized visual content. The stabilized visual content may be generated as instructions to render the visual content for presentation. The instructions (e.g., director track) may define which visual portions of the visual content (images, video frames) should be included within the presentation of the visual content. The instructions may include information on the location, size, shape, and/or rotation of the punchout of images/video frames to be used to as a function progress through the progress length (e.g., capture duration, duration of stabilized visual content) of the visual content to provide a stabilized view of the images/video frames. A video player may use the instructions to retrieve the relevant visual portions of the images/video frames when the visual content is opened and/or is to be presented.

The generation component 108 may be configured effectuate storage of the stabilized visual content and/or other information in one or more storage media. For example, the stabilized visual content (e.g., video file, director track) may be stored in the electronic storage 13, remote storage locations (storage media located at/accessible through a server), and/or other locations. In some implementations, the generation component 108 may effectuate storage of the stabilized visual content through one or more intermediary devices. For example, the processor 11 may be located within a computing device without a connection to the storage device (e.g., the computing device lacks WiFi/cellular connection to the storage device). The generation component 108 may effectuate storage of the stabilized visual content through another device that has the necessary connection (e.g., the computing device using a WiFi/cellular connection of a paired mobile device, such as a smartphone, tablet, laptop, to store information in one or more storage media). Other storage locations for and storage of the stabilized visual content are contemplated.

Video content may refer media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include visual content (e.g., stabilized visual content) viewable as a function of progress through a progress length of the video content. Video content may include video frames that define visual content. That is, visual content of the video content may be included within video frames of the video content. The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames).

In some implementations, the processor 11 may represent multiple processors, and at least one of the processors may be a remote processor located remotely from the housing of the image capture device (e.g., the image capture device 302). One or more of the functionalities of the components 102, 104, 106, 108 may be performed by the image capture device 302 (e.g., by the processor 310) and/or by a remote processor. For example, one or more of position determination (functionalities of the position component 102), smoothed position determination (functionalities of the smoothed position component 104), viewing window determination (functionalities of the viewing window component 106), and/or stabilized visual content generation (functionality of the generation component 108) may be performed by the remote processor post capture of the visual content by the image capture device. As another example, stabilized visual content generation may be performed by the processor 310 during capture of the visual content to provide the stabilized visual content during capture of the visual content.

In some implementations, the visual content may not be stabilized in/near real time. For example, the image capture device may not have sufficient resource to apply the stabilization technique described herein in real-time and/or may be devoting its resources to other tasks. The stabilization of the visual content may be performed by the image capture device once sufficient resource becomes available. The stabilization of the visual content may be performed by the remote processor. For example, the remote processor may be one or more processors of a remote computing device (e.g., mobile device, desktop, server), and the remote processor may receive visual information and the position information captured/generated by the image capture device. The remote computing device (software running on the remote computing device) may apply the stabilization technique described herein post capture of the visual content by the image capture device. The post-capture stabilization of the visual content may be performed by the remote processor responsive to reception of the visual information and position information, responsive to user/system command to stabilize the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
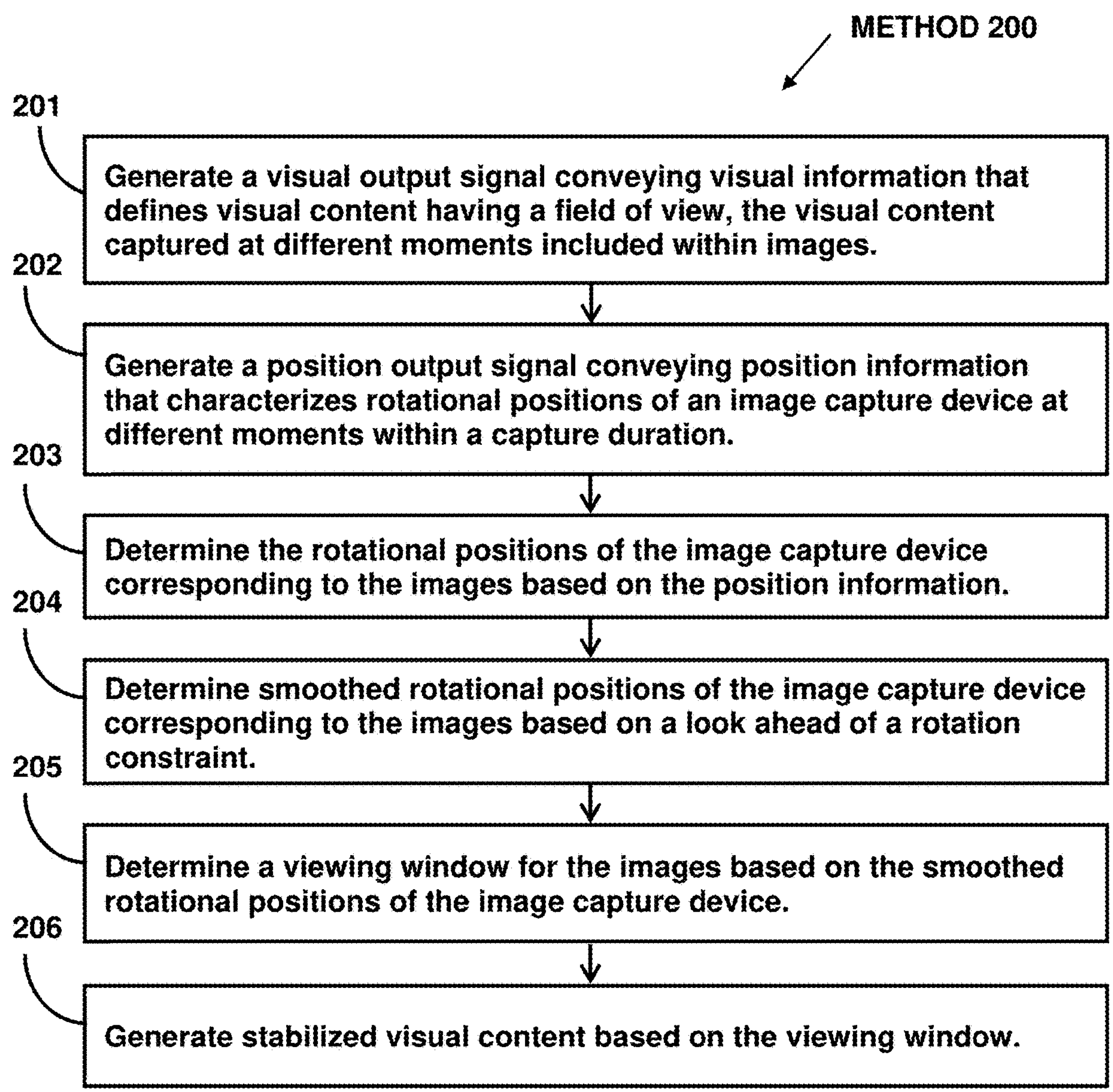
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, a visual output signal may be generated. The visual output signal may convey visual information that defines visual content having a field of view. The visual content captured at different moments within a capture duration may be included within images. The images may include a first image including the visual content captured at a first moment within the capture duration, a second image including the visual content captured at a second moment subsequent to the first moment within the capture duration, and/or other images. In some implementation, operation 201 may be performed by a component the same as or similar to the image sensor 306 (Shown in FIG. 3 and described herein).

At operation 202, a position output signal may be generated. The position output signal may convey position information that characterizes rotational positions of an image capture device at different moments within the capture duration. In some implementation, operation 202 may be performed by a component the same as or similar to the position sensor 308 (Shown in FIG. 3 and described herein).

At operation 203, the rotational positions of the image capture device corresponding to the images may be determined based on the position information and/or other information. The rotational positions may include a first rotational position corresponding to the first image, a second rotational position corresponding to the second image, and/or other rotational positions corresponding to other images. In some implementation, operation 203 may be performed by a processor component the same as or similar to the position component 102 (Shown in FIG. 1 and described herein).

At operation 204, smoothed rotational positions of the image capture device corresponding to the images may be determined based on a look ahead of a rotation constraint and/or other information. The look ahead of the rotation constraint may include determination of whether the rotation constraint is violated for one or more subsequent images to determine a smoothed rotational position corresponding an individual image. A first smoothed rotational position corresponding to the first image may be determined based on determination of whether the crop-constraint is violated for the second image captured subsequent to the first image. In some implementation, operation 204 may be performed by a processor component the same as or similar to the smoothed position component 104 (Shown in FIG. 1 and described herein).

At operation 205, a viewing window for the images may be determined based on the smoothed rotational positions of the image capture device and/or other information. The viewing window may define one or more extents of the images to be included within stabilized visual content. In some implementation, operation 205 may be performed by a processor component the same as or similar to the viewing window component 106 (Shown in FIG. 1 and described herein).

At operation 206, the stabilized visual content may be generated based on the viewing window and/or other information. The stabilized visual content may include a punchout of the extent(s) of the images within the viewing window. In some implementation, operation 206 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that stabilizes videos, the system comprising:

one or more physical processors configured by machine-readable instructions to:

determine rotational positions of an image capture device corresponding to images captured by the image capture device, the images including visual content having a field of view, the images including a first image captured at a first moment and a second image captured at a second moment subsequent to the first moment, the rotational positions including a first rotational position corresponding to the first image and a second rotational position corresponding to the second image;

determine smoothed rotational positions of the image capture device corresponding to individual ones of the images based on whether a rotation constraint is violated for one or more subsequent images to the individual ones of the images, wherein a first smoothed rotational position corresponding to the first image is determined based on whether the rotation constraint is violated for the second image;

determine a viewing window for the images based on the smoothed rotational positions of the image capture device, the viewing window defining one or more extents of the images to be included within stabilized visual content; and generate the stabilized visual content based on the viewing window, the stabilized visual content including the one or more extents of the images within the viewing window.

2. The system of claim 1, wherein the rotation constraint is violated based on the viewing window extending beyond the field of view of the visual content.

3. The system of claim 1, wherein the determination of the smoothed rotational positions of the image capture device corresponding to the individual ones of the images includes one or more adjustments of a size of a smoothing window for smoothing the rotational positions of the image capture device based on whether the rotation constraint is violated for the one or more subsequent images to the individual ones of the images.

4. The system of claim 3, wherein the size of the smoothing window corresponds to a number of the rotational positions of the image capture device that are smoothed to determine the smoothed rotational positions of the image capture device.

5. The system of claim 4, wherein the size of the smoothing window is adjusted such that the rotation constraint is satisfied for the one or more subsequent images.

6. The system of claim 5, wherein the size of the smoothing window is adjusted by incrementing or decrementing the number of the rotational positions of the image capture device included within the size of the smoothing window.

7. The system of claim 6, wherein:

the first image and the second image are adjacent video frames;

the size of the smoothing window includes a first size for the first image and a second size for the second image;

the second size for the second image is determined based on copying, incrementing, or decrementing the first size.

8. The system of claim 7, wherein the size of the smoothing window is adjusted to maximize the size of the smoothing window while satisfying the rotation constraint.

9. The system of claim 8, wherein the smoothing window includes a first number of preceding rotational positions of the image capture device and a second number of subsequent rotational positions of the image capture device.

10. The system of claim 1, wherein at least one of the one or more physical processors is a remote processor located remotely from the image capture device, and generation of the stabilized visual content is performed by the remote processor post capture of the images by the image capture device.

11. A method for stabilizing videos, the method performed by a system including one or more processors, the method comprising:

determining, by the one or more processors, rotational positions of an image capture device corresponding to images captured by the image capture device, the images including visual content having a field of view, the images including a first image captured at a first moment and a second image captured at a second moment subsequent to the first moment, the rotational positions including a first rotational position corresponding to the first image and a second rotational position corresponding to the second image;

determining, by the one or more processors, smoothed rotational positions of the image capture device corresponding to individual ones of the images based on whether a rotation constraint is violated for one or more subsequent images to the individual ones of the images, wherein a first smoothed rotational position corresponding to the first image is determined based on whether the rotation constraint is violated for the second image;

determining, by the one or more processors, a viewing window for the images based on the smoothed rotational positions of the image capture device, the viewing window defining one or more extents of the images to be included within stabilized visual content; and generating, by the one or more processors, the stabilized visual content based on the viewing window, the stabilized visual content including the one or more extents of the images within the viewing window.

12. The method of claim 11, wherein the rotation constraint is violated based on the viewing window extending beyond the field of view of the visual content.

13. The method of claim 11, wherein the determination of the smoothed rotational positions of the image capture device corresponding to the individual ones of the images includes one or more adjustments of a size of a smoothing window for smoothing the rotational positions of the image capture device based on whether the rotation constraint is violated for the one or more subsequent images to the individual ones of the images.

14. The method of claim 13, wherein the size of the smoothing window corresponds to a number of the rotational positions of the image capture device that are smoothed to determine the smoothed rotational positions of the image capture device.

15. The method of claim 14, wherein the size of the smoothing window is adjusted such that the rotation constraint is satisfied for the one or more subsequent images.

16. The method of claim 15, wherein the size of the smoothing window is adjusted by incrementing or decrementing the number of the rotational positions of the image capture device included within the size of the smoothing window.

17. The method of claim 16, wherein:

the first image and the second image are adjacent video frames;

the size of the smoothing window includes a first size for the first image and a second size for the second image;

the second size for the second image is determined based on copying, incrementing, or decrementing the first size.

18. The method of claim 17, wherein the size of the smoothing window is adjusted to maximize the size of the smoothing window while satisfying the rotation constraint.

19. The method of claim 18, wherein the smoothing window includes a first number of preceding rotational positions of the image capture device and a second number of subsequent rotational positions of the image capture device.

20. The method of claim 11, wherein at least one of the one or more processors is a remote processor located remotely from the image capture device, and generation of the stabilized visual content is performed by the remote processor post capture of the images by the image capture device.

* * * * *